Dec. 31, 1957  E. L. ALLMAN, SR  2,817,902
ADJUSTABLE TOOL HOLDER
Filed Aug. 24, 1953  2 Sheets-Sheet 1

Earl L. Allman, Sr.
INVENTOR.

Dec. 31, 1957  E. L. ALLMAN, SR  2,817,902
ADJUSTABLE TOOL HOLDER
Filed Aug. 24, 1953  2 Sheets-Sheet 2
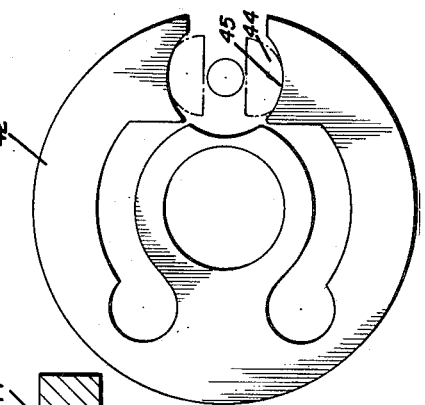
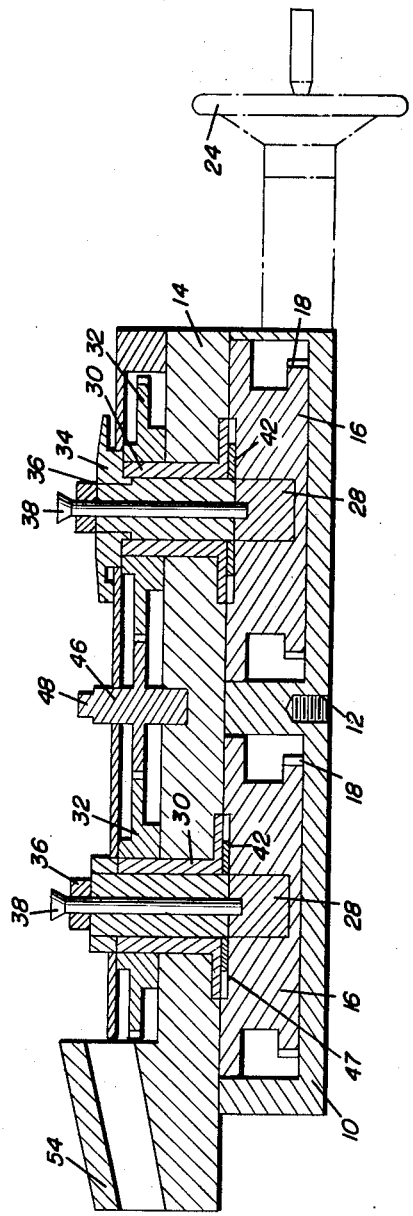
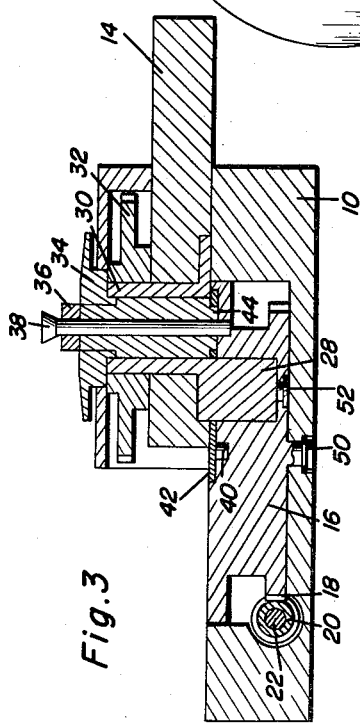
Earl L. Allman, Sr.
INVENTOR.

2,817,902
ADJUSTABLE TOOL HOLDER
Earl L. Allman, Sr., San Pedro, Calif.
Application August 24, 1953, Serial No. 375,855
4 Claims. (Cl. 33—27)

This invention relates to an adjustable tool holder and more specifically provides an adjusting means for moving a work performing tool in a circular path.

An object of this invention is to provide an adjustable tool holder for moving a working tool in a circular path wherein the radius of the movement may be set at a desired radius.

Another object of this invention is to provide an adjustable tool holder wherein index means is provided to determine the radius of circular movement to various predetermined radii.

A further object of this invention is to provide an adjustable tool holder which may be used in various machines where it is desirous of performing work of a circular nature.

Another important object of this invention is to provide an adjustable tool holder that may be used in conjunction with any working tool that is moved in a circular motion such as a cutting torch, boring machines, milling machines, lathes, etc.

A still further object of this invention is to provide an adjustable tool holder which may be easily adjusted to move the tool in circles of different radii.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a longitudinal, vertical section taken substantially along section line 2—2 of Figure 1 showing the details of construction of the various elements of the tool holder;

Figure 3 is a transverse, vertical section taken substantially along section line 3—3 of Figure 1 showing details of the operating mechanism of this invention; and Figure 4 is a detail plan view of the lock washer or ring which locks the adjustable crank of the tool holder in various adjusted positions in relation to the index gears with the expansion means for the lock washer shown in phantom.

Figure 1:
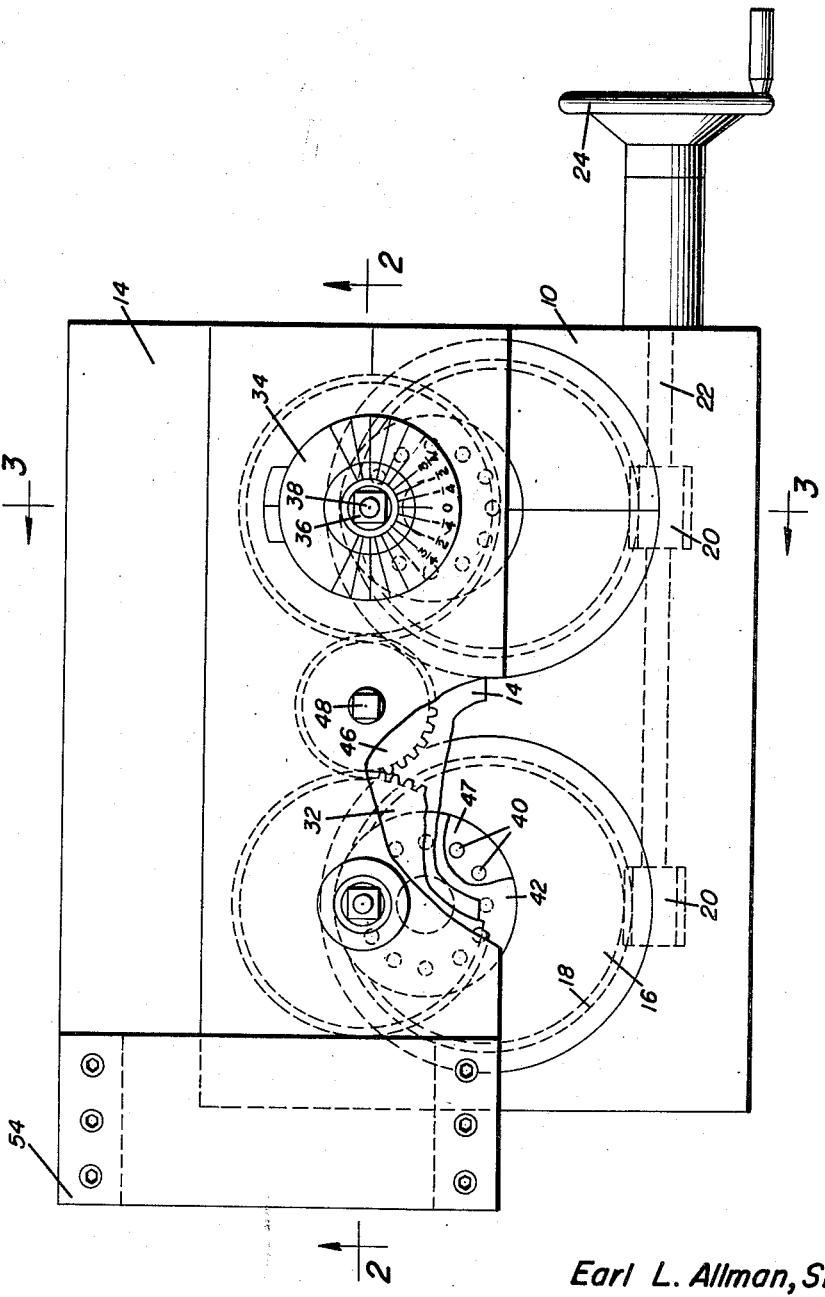
Figure 1 is a top plan view showing the general organization of the adjustable tool holder of this invention with the dial indicator visible and portions broken away for showing the index holes, index gears, locking ring and other details.

Referring now more specifically to the drawings, it will be seen that the numeral 10 generally designates a base having suitable attachment means 12 for securing it to a supporting surface and having an adjustable tool carrier 14 movably supported thereon.

Now looking at Figures 1–3 it will be seen that a pair of index gears are rotatably mounted in said base 10 with the lower edge of said index gears 16 being provided with gear teeth 18 and each of said index gears 16 are engaged by a worm gear 20 which is secured to an operating shaft 22 and is rotated by a hand wheel 24 projecting from one edge of the base member 10 for simultaneously rotating the index gears 16. As best seen in Figures 2 and 3, a crank member 28 is rotatably journaled in each of said index gears 16 with the rotatable axis of the cranks 28 being offset from the rotatable axis of the gear 16. It will be clearly seen by Figure 3 that the upper offset portion 30 of the crank member 28 has journaled thereon the tool carrier 14 and secured thereto a gear member 32 above the tool carrier 14 for purpose described hereinafter. The offset portion 30 of one of the cranks carries a dial member 34 which has suitable indicia on the upper face thereof and so arranged with a base line on the tool carrier 14 so that various radii of movement of the tool carrier 14 may be set.

Referring more specifically to Figures 2 and 3, it will be seen that the upstanding offset portion 30 of each of the cranks 28 is formed in a tubular manner and rotatably receives therein a locking cam 36 which has an axial bore extending throughout its length and has a polygonal member projecting from the upper end thereof for engagement by suitable turning means such as a wrench or the like. An index pin 38 is removably positioned in the bore of the locking cam 36 and is received in selective index holes 40 in the index gear which are spaced arcuately about a center which coincides with the center of rotation of the cranks 28 in the index gears 16. Interposed between the upper surface of the index gears 16 and the offset portion of the crank 28 is a locking ring 42 in the form of a substantially flat expanding washer. As best seen in Figure 3, the locking cam 36 has a cammed lower end portion 44 which is received in an opening 45 in the locking ring 42 and as the member 36 is rotated a quarter turn it will be obvious that the spring ring or washer 42 expands and locks itself about its periphery to the recess 47 in the index gear in which the lock ring 42 is seated.

As best seen in Figures 1 and 2, it will be seen that the gears 32 are in mesh with an idler gear 46 which has a polygonal portion 48 for engagement with suitable turning means such as a wrench for rotating the gears 32 and the cranks 28 about their pivotal axis in the index gears 16 for setting the radius of movement of the tool carrier 14 by the use of the indicating dial 34 and the suitable indicia on the upper face thereof.

The operation of the device will be readily understood. With the index gears 16 and the cranks 28 locked in angular position by the use of the index pins 38 or the locking cam 36 and locking ring 42 the rotation of the index gears 16 by turning the hand wheel 24 and worm gears 20 will cause the crank 28 to move in a circular path about the center of the index gears 16 thereby imparting a circular motion to the tool carrier 14. As clearly seen in Figure 1, the index holes 40 which receive the index pin 38 are disposed about a center which is coincident with the axis of the crank 28 and by inserting the index pin 38 into selective index holes 40 the tool carrier will be set in a predetermined position having a predetermined radius and the setting may be retained and the circle may be repeated as often as desired. It will be seen that in the setting as shown in Figure 1 the circular movement of the tool carrier will move in its greatest radius and when the index pin is removed and the offset portion 30 moved around so that the index pin 38 is inserted in a hole 40 which is directly over the rotational center of the index gear that no movement will be imparted to the tool holder and the various holes 40 between these extreme positions will give an adjustment of the radius of movement of the tool carrier 14. The index pins 38 may be removed and the offset portion 30 moved about its rotational center in gear 16 to any desired position by gears 32 and 46 and the locking cam 36 given one-quarter of a turn which locks the locking ring 42 to the recess portion 47 of the index gears 16 thereby locking the cranks 28 to the index gears 16 which gives a minute adjustment of the cranks 28 in relation to the gears 16 between the index holes 40 for obtaining a radius of movement of the tool carrier 14 as desired. The offset portion 30 of the crank 28 may be moved about its rotational center in gear 16 when the index pin 38 is removed and the locking cam 36 is released thereby permitting movement of the crank relative to the index gears 16 and such movement is caused by rotation of the setting gears 46 which is in mesh with the gears 32 wherein such rotation of gears 32 which are secured to the crank 28 causes rotation of the crank about its rotational center and consequent movement of the tool carrier to any desired setting and then either the locking pins 38 are inserted into an index hole 40 if one is aligned with the bore in the locking cam 36 or the locking cam 36 is given a quarter turn which locks the crank 28 to the index gears 16 and by manipulation of the hand wheel 24 the tool carrier 14 is moved in a circular motion by the offset portion 30 of the crank 28 in an obvious manner.

Obviously, the index gears 16 and the cranks 28 are provided with suitable journaled means 50 and 52 for maintaining the gears and crank in correct rotational position. It appears manifest that suitable means 54 is provided to carry any suitable tools, not shown, on the tool carrier 14 and the adjustable tool holder of this invention may be used to support or move any tools such as those used in lathe work, milling work, boring work, and cutting work, or any such torches that may be desirous in cutting true and accurate circles or parts of circles from some stock material.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An adjustable tool holder comprising a supporting base, a pair of rotatable index gears in said base, a handwheel and worm gears for actuating said index gears in unison, a crank rotatably journaled in each index gear with the axis of the crank being offset from the axis of the index gear, a tool carrier carried by said cranks, means to lock said cranks and said index gears in adjusted position, and means to rotate said cranks in relation to the index gears when the index gears and cranks are unlocked, said lock means comprising an expansible and contractable lock ring disposed in a recess in each index gear and a locking cam engaging said ring for expanding and contracting said ring, said cam connected to said crank for movement therewith wherein the index gears and cranks may be selectively locked and unlocked.

2. An adjustable tool holder comprising a supporting base, a pair of rotatable index gears in said base, a handwheel and worm gears for actuating said index gears in unison, a crank rotatably journaled in each index gear with the axis of the crank being offset from the axis of the index gear, a tool carrier carried by said cranks, means to lock said cranks and said index gears in adjusted position, and means to rotate said cranks in relation to the index gears when the index gears and cranks are unlocked, said cranks being provided with a pair of gears in engagement with an adjustment idler gear, said last named gears forming the means for rotating the cranks about their axes when they are in an unlocked condition.

3. An adjustable tool holder comprising a supporting base, a pair of index gears rotatably mounted on said base, means for simultaneously rotating said gears, an eccentric crank rotatably mounted on each of said gears, a movable tool carrier supported on said cranks, means disposed between said cranks and gears for selectively locking the gears and cranks in adjusted relation, and means for adjusting the angular position of said cranks thereby varying the paths of movement of the tool carrier, said adjusting means including a gear member rigidly mounted on each of said cranks, an idler gear journaled on said tool carrier in meshing engagement with the gear members, said idler gear adapted to be rotated for adjusting the angular position of the cranks in respect to the index gears when the cranks and index gears are in unlocked relation.

4. An adjustable tool holder comprising a supporting base, a pair of index gears rotatably mounted on said base, means for simultaneously rotating said gears, an eccentric crank rotatably mounted on each of said gears, a movable tool carrier supported on said cranks, means disposed between said cranks and gears for selectively locking the gears and cranks in adjusted relation, and means for adjusting the angular position of said cranks thereby varying the paths of movement of the tool carrier, said locking means including expandible means disposed between the index gears and the cranks, each of said cranks being provided with a hollow bore, actuating means for said expandible means disposed in said bores for operating the expandible means from the upper end of the cranks, said index gears having a series of sockets, and a removable index pin interconnecting the crank and a selective socket for selectively locking the cranks and gears in adjusted angular position.

References Cited in the file of this patent

UNITED STATES PATENTS

| 272,511 | Angell | Feb. 20, 1883 |
| 276,292 | Seymour | Apr. 24, 1883 |
| 1,931,143 | Feit | Oct. 17, 1933 |
| 2,189,242 | Edwin | Feb. 6, 1940 |
| 2,470,097 | Goulette | May 17, 1949 |
| 2,581,980 | Suber | Jan. 8, 1952 |

FOREIGN PATENTS

| 608,453 | France | July 28, 1926 |